Apr. 24, 1923.

T. BOWDEN 1,452,636

TOY VEHICLE

Filed Aug. 26, 1922

Inventor

T. Bowden

By Watson E. Coleman
Attorney

Patented Apr. 24, 1923.

1,452,636

UNITED STATES PATENT OFFICE.

THOMAS BOWDEN, OF FOREST CITY, PENNSYLVANIA.

TOY VEHICLE.

Application filed August 26, 1922. Serial No. 584,469.

*To all whom it may concern:*

Be it known that I, THOMAS BOWDEN, a citizen of the United States, residing at Forest City, in the county of Susquehanna and State of Pennsylvania, have invented certain new and useful Improvements in Toy Vehicles, of which the following is a specification, reference being had to the accompanying drawings.

This invention relates to improvements in toys, and more particularly to improvements in a vehicle toy.

An important object of the invention is to provide a combined sled and wagon which is readily convertible for use as either of these articles.

A further object of the invention is to provide a novel and improved draft appliance whereby the sled or wagon may be drawn when desired, as when returning after coasting down a hill, which draft appliance when released assumes a position beneath the vehicle at a point where it is completely out of the way and will not in any manner interfere with the operation of the device when coasting.

A still further object of the invention is to provide a novel and improved wheel structure for combined toys of this character, which wheel structure so coacts with the axle upon which it is mounted that while normally it is held securely against accidental removal from the axle, at the same time it may be readily removed with a minimum of labor whenever it is desired to convert the wagon to a sled.

An additional object of the invention is to provide a device of this character which is very simple in its construction and arrangement, durable in service, and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings :—

Figure 1 is a side elevation of a combined vehicle constructed in accordance with my invention;

Figure 2 is a bottom plan view partially in section of the front truck of the vehicle;

Figure 3 is a longitudinal section on the line 3—3 of Figure 2;

Figure 4 is a fragmentary sectional view showing the manner of mounting the wheels upon the axles;

Figure 5 is a fragmentary side elevation of the hub portion of the wheel as mounted upon the axle, the cover plate of the hub being removed; and Figure 6 is a perspective view of the bearing employed for mounting the draft rope shaft.

Referring now more particularly to the drawings, the numeral 10 indicates a body frame having mounted at the rear end thereof a pair of fixed runner frames 11 provided with any suitable runners 12 and forming the rear construction of a bob-sled. The sled is provided forwardly with a fifth wheel mounting 13, the lower plate of which is secured to a dirigible steering sled 16, the side frames of which are similar in construction to the side frames of the rear portion of the vehicle. Extending transversely of the dirigible sled and mounted in the side frames 17 thereof, is a shaft 18, and mounted in the frames 11 hereinbefore described is a second shaft. The ends of these shafts project beyond the outer faces of the frames 11 and 17 and have removably mounted thereon supporting wheels 19, the lower edges of which, when the wheels are in position upon the shafts, project below the lower edges of the runners 12 and support these runners in spaced relation to the ground, permitting the device to be employed as a wagon. The dirigible sled 16 has rigidly secured thereto a plate 20 having an upstanding shaft 21 secured thereto and projecting through the body frame 10. At its upper end this shaft is secured to one element of a universal joint 22, the other element of which is secured to the lower end of the steering shaft 23 mounted in a suitable support 24 extending upwardly from the body frame 10 and having at its upper end a steering wheel 25 by means of which it may be controlled. From the foregoing it will be seen that the device is capable of use either as a sled or wagon, since by the removal of the wheels 19 the runners 12 of the sled portions come into engagement with the ground. It will likewise be obvious that when employed either as a sled or wagon, the device may be steered through medium of the steering wheel 25.

In order to provide for ready removal of the wheels 19, I provide each of such wheels upon its hub portion 26, which rotatably receives its shaft 18, with a pivoted latching member 27, the pivot being arranged adjacent one end of the latching member. Intermediate its ends, the latching member 27 is provided with a cove 28 of less diameter than the normal diameter of the shaft 18. Beyond the cove from the pivot point of the latch member, a spring 29 has one end thereof secured to the latch member and the opposite end thereof secured to the hub 26. The shaft 18 is provided immediately adjacent its end with a groove 30 of sufficient size to receive the latching member 27 at the cove 28 thereof. It will be obvious that the latching member when engaged in this cove will effectually prevent the removal of the wheel from the shaft and at the same time it being merely spring held, the latching member may be readily withdrawn to permit withdrawal of the wheels when removal of the same is desired. The outer face of the hub portion and the latching member 27 together with its spring 29 are enclosed by a hub cover 31 which protects the spring against the collection of dirt and the action of the weather, this cover plate being provided with a slot 32 through which the operating end portion 33 of the latching member 27 extends so that it may be readily engaged to withdraw the latch member and permit the removal of the wheels.

In vehicles of this type, particularly when the same are employed as sleds, a towing rope is desired and for proper handling of a sled, it is necessary that the towing rope be secured to points at opposite sides of the forward end of the steering sled so that sidewise slipping of the sled may be avoided. These towing ropes while necessary, are considerably in the way when coasting, due to the fact that they must be laid upon the top of the sled and unless firmly held or fastened in some manner, often fall from the sled getting beneath the runners and causing the sled to be extremely difficult to guide and interfering with the progress thereof. In order to provide a suitable tow rope and at the same time mount the same so that the danger of the rope getting beneath the runners is entirely eliminated and the rope will be entirely out of the way during coasting operations, I provide upon the adjacent faces of the side frames 17 of the bob-sled 16, bearings 34 which are secured to such adjacent faces and which are provided with a slot opening rearwardly thereof, as indicated at 35, which slot affords access to the bearing cove 36 of the bearings to permit insertion of the shaft 37 therein, this shaft bridging the distance between the adjacent faces of the side frames 17 and acting as a support to prevent movement of these frames toward one another. In addition to the shaft 37, I provide spaced braces 38 and 39, which provide means for attachment for a casing 40, including a spring motor geared to the shaft to drive the same, this casing having at its front and rear ends attaching straps 41 which extend beneath the point of securing the braces 38 and 39 to the frames 42 of the bob-sled and having securing elements extended therethrough to hold the same in position. The shaft 37 is journaled in this casing and is accordingly held against movement and engaged in the coves 36 of the bearings 34 when the casing 40 is secured in applied position.

To the ends of the shaft 37 adjacent the bearings are secured drums comprising spaced end plates 43 through which the shaft 37 extends, and a plurality of spaced bars 44 arranged concentrically with the shaft 37 and forming a reel upon which the towing rope may be wound. The towing rope 45 has its ends extending through suitable guides 46 secured to the forward ends of the side frames 17 of the bob sled 16 and passed between adjacent bars 44 and secured to the shaft 37, each end being secured to one of the drums. By this construction, when the bight 47 of the towing rope is engaged with the hand to draw the sled or wagon, the towing rope is permitted to extend, unwinding from the reels a sufficient distance to permit draft of the vehicle without danger of the same coming into contact with the heels of the person pulling it. The rotation of the drums caused by a pull exerted upon the bight portion 47 is imparted to the shaft 37 and from this shaft through the gearing to the spring 48 of the spring motor which is tensioned and which accordingly will cause reverse rotation of the shaft 37 and withdrawal of the tow rope 45 to the position shown in Figures 2 and 3 immediately upon its release. It will be obvious that in the position shown it will be impossible for the rope to become entangled with either the runners or wheels of the vehicle and at the same time the rope will be readily accessible for use without the necessity of operating any manual releases or similar devices for holding the same in position.

From the foregoing it is believed to be obvious that a combined vehicle constructed in accordance with my invention is particularly well adapted for the purpose for which it is intended for the reason that it may be readily converted from a wagon to a sled with a minimum loss of time and provides means whereby it may be drawn which are automatically removed from all possibility of interference with the operation of the device during coasting. It will furthermore be obvious that the construction hereinbefore set forth is capable of some change and modification without materially departing from the spirit of my invention and I accordingly do not limit myself thereto except as hereinafter claimed.

I claim:—

1. In combination with a vehicle embodying a dirigible steering element, of a tow rope mounting for the vehicle including a shaft extending transversely of the dirigible element having its ends rotatably mounted in bearings carried thereby, a spring motor engaged with said shaft, drums carried by said shaft adjacent the ends thereof, a flexible towing element having its ends secured to said drums, and means for supporting the flexible element at spaced points spaced forwardly of said shaft.

2. In combination with a vehicle embodying a dirigible steering element, of a tow rope mounting for the vehicle including a shaft extending transversely of the dirigible element having its ends rotatably mounted in bearings carried thereby, a spring motor engaged with said shaft, drums carried by said shaft adjacent the ends thereof, a flexible towing element havings its ends secured to said drums, means for supporting the flexible element at spaced points spaced forwardly of said shaft, said shaft being insertible in said bearings by a movement of the shaft longitudinally of said dirigible steering element, means for maintaining the shaft in position within said bearings including a casing for said spring motor in which said shaft is journaled, and means for rigidly attaching the casing to such dirigible steering element.

In testimony whereof I hereunto affix my signature.

THOMAS BOWDEN.